(12) United States Patent
Lysiansky et al.

(10) Patent No.: US 6,724,964 B2
(45) Date of Patent: Apr. 20, 2004

(54) OPTICAL WAVEGUIDE EXHIBITING STRONGLY POSITIVE DISPERSION, AND SYSTEM UTILIZING SAME

(75) Inventors: Michael Lysiansky, Ramat Gan (IL); Michael Rosenblit, Ashdod (IL); Huailiang Wei, Allen, TX (US)

(73) Assignee: Lasercomm Inc., Plano, TX (US)

( * ) Notice: Subject to any disclaimer, the term of this patent is extended or adjusted under 35 U.S.C. 154(b) by 223 days.

(21) Appl. No.: 10/058,023

(22) Filed: Jan. 29, 2002

(65) Prior Publication Data

US 2002/0141716 A1 Oct. 3, 2002

Related U.S. Application Data

(60) Provisional application No. 60/264,724, filed on Jan. 30, 2001.

(51) Int. Cl.[7] .............................. G02B 6/02; G02B 6/16; G02B 6/18
(52) U.S. Cl. ........................................ 385/123; 385/124
(58) Field of Search ................................ 385/123, 124, 385/27, 28; 368/81

(56) References Cited

U.S. PATENT DOCUMENTS

| | | | |
|---|---|---|---|
| 4,261,639 A | 4/1981 | Kogelnick et al. | |
| 5,559,920 A | 9/1996 | Chraplyvy et al. | |
| 5,748,824 A * | 5/1998 | Smith | 385/124 |
| 5,781,673 A | 7/1998 | Reed et al. | |
| 6,009,221 A | 12/1999 | Tsuda | |
| 6,031,956 A * | 2/2000 | Li et al. | 385/124 |
| 6,091,873 A | 7/2000 | Matsuo et al. | |
| 6,212,322 B1 * | 4/2001 | Ma et al. | 385/123 |
| 6,421,491 B1 * | 7/2002 | Liu | 385/127 |
| 6,424,777 B2 * | 7/2002 | Ma et al. | 385/123 |
| 6,442,320 B1 * | 8/2002 | Danziger et al. | 385/123 |

* cited by examiner

Primary Examiner—Thomas M. Sember
Assistant Examiner—Peter Macchiarolo
(74) Attorney, Agent, or Firm—Simon M. Kahn

(57) ABSTRACT

An optical waveguide designed to generate positive dispersion when operated in a high order mode. The optical waveguide in one embodiment is designed to generate positive dispersion slope, in another embodiment to generate negative dispersion slope and in yet another embodiment nominally zero dispersion slope. In one embodiment the high order mode is the $LP_{02}$ mode and in another embodiment the high order mode is the $LP_{03}$ mode. In another embodiment the optical waveguide is a few mode fiber. In an exemplary embodiment the optical waveguide is used in combination with a mode transformer, such as a transverse mode transformer to achieve the desired high order mode.

20 Claims, 7 Drawing Sheets

OPTICAL WAVEGUIDE EXHIBITING STRONGLY POSITIVE DISPERSION, AND SYSTEM UTILIZING SAME

CROSS-REFERENCE TO RELATED APPLICATIONS

The present application claims the benefit of the filing date of copending U.S. Provisional Application, Ser. No. 60/264,724 filed Jan. 30, 2001, entitled "Optical Waveguide Exhibiting Strongly Positive Dispersion, and System Utilizing Same" and incorporates by reference co-pending U.S. patent application, Ser. No. 09/549,442 filed Apr. 14, 2000 entitled "Limited Mode Dispersion Compensating Optical Fiber" and co-pending U.S. patent application Ser. No. 09/248,969 filed Feb. 12, 1999 entitled "Transverse Spatial Mode Transformer for Optical Communication".

BACKGROUND OF THE INVENTION

Optical fiber has become increasingly important in many applications involving the transmission of light. When a pulse of light is transmitted through an optical fiber, the energy follows a number of paths which cross the fiber axis at different angles. A group of paths which cross the axis at the same angle is known as a mode. The fundamental mode, also known as the $LP_{01}$ mode, is the mode in which light passes substantially along the fiber axis. Modes other than the $LP_{01}$, mode, are known as high order modes. Fibers which have been designed to support only one mode with minimal loss, the $LP_{01}$ mode, are known as single mode fibers. High order modes exhibit characteristics which may be significantly different than the characteristics of the fundamental mode. There exists both even and odd high order modes. Even high order modes exhibit circular symmetry, and are thus ideally suited to circular waveguides such as optical fibers.

A multi-mode fiber is a fiber whose design supports multiple modes, and typically supports over 100 modes. A few-mode fiber is a fiber designed to support only a very limited number of modes. For the purpose of this patent, we will define a few mode fiber as a fiber supporting no more than 20 modes at the operating wavelength. Few mode fibers designed to have specific characteristics in a mode other than the fundamental mode are also known as high order mode (HOM) fibers. Fibers may carry different numbers of modes at different wavelengths, however in telecommunications the typical wavelengths are near 1310 nm and 1550 nm.

As light traverses the optical fiber, different group of wavelengths travel at different speeds, which leads to chromatic dispersion. This limits the bit rate at which information can be carried through an optical fiber. The effect of chromatic dispersion on the optical signal becomes more critical as the bit rate increases. Chromatic dispersion in an optical fiber is the sum of material dispersion and the waveguide dispersion and is defined as the differential of the group velocity in relation to the wavelength and is expressed in units of picosecond/nanometer (ps/nm). Optical fibers are often characterized by their dispersion per unit length of 1 kilometer, which is expressed in units of picosecond/nanometer/kilometer (ps/nm/km). For standard single mode fiber (SMF), dispersion at 1550 nm is typically on the order of 17 ps/nm/km.

The dispersion experienced by each wavelength of light is also different, and is primarily controlled by a combination of the material dispersion, and the dispersion created by the actual profile of the waveguide, known as waveguide dispersion. The differential of the dispersion in relation to wavelength is known as the slope, or second order dispersion, and is expressed in units of $ps/nm^2$. Optical fibers may be further characterized by their slope per unit length of 1 kilometer, which is expressed in units of picosecond/nanometer$^2$/kilometer ($ps/nm^2/km$).

At high bit rates, compensating for the slope is important so as to avoid "walk off", which occurs when one wavelength in the band is properly compensated for, however other wavelengths in the operating band are left with significant dispersion due to the effect of the dispersion slope. The dispersion slope of standard single mode fiber at 1550 nm is typically on the order of 0.06 $ps/nm^2/km$.

In order to achieve the high performance required by today's communication systems, with their demand for ever increasing bit rates, it is necessary to reduce the effect of chromatic dispersion and slope. Several possible solutions are known to the art, including both active and passive methods of compensating for chromatic dispersion. One typical passive method involves the use of dispersion compensating (DC) fibers. DC fiber has dispersion properties that compensate for the chromatic dispersion inherent in optical communication systems. DC fibers exist that are designed to operate on both the fundamental or lowest order mode ($LP_{01}$) and on higher order modes. Fibers designed to operate on higher order modes require the use of a mode converter so as to convert the optical signal from the fundamental mode to a high order mode. One desired property of DC fiber is that its dispersion should be of opposite sign of the dispersion of the transmission fiber that it is connected to. A large absolute value of dispersion of opposite sign reduces the length of fiber required to compensate for a large length of transmission fiber. Another desired property of a DC fiber is low optical signal attenuation. Ideally such a DC fiber should compensate for both chromatic dispersion and dispersion slope, and would be operative over the entire transmission bandwidth. The optical transmission bandwidth typically utilized is known as the "C" band, and is conventionally thought of as from 1525 nm–1565 nm. Longer wavelengths are also coming into usage, and are known as the "L" band, consisting of the wavelengths from 1565 nm–1610 nm.

Typical dispersion compensating fibers are designed as single mode fibers which support only the fundamental or lowest order spatial mode ($LP_{01}$) at typical operating wavelengths. Such fibers are typically characterized as having relatively low negative dispersion, high loss, small $A_{eff}$ and a resultant low tolerance for high power and limited compensation of slope, and are designed to compensate for transmission fibers exhibiting positive dispersion and positive dispersion slope, i.e. the dispersion increasing with increasing wavelength and is above zero in the operative band. Higher order spatial modes are typically not supported (i.e. not guided) through the fiber.

Other transmission fibers have been designed which exhibit negative dispersion and positive slope over the transmission band. Such fibers are disclosed for example in U.S. Pat. No. 6,091,873 and are conventionally known as negative non-zero dispersion shifted fibers (negative NZDSF), or reverse dispersion fibers (RDF). These fibers exhibit zero dispersion at a wavelength above the "C" band, and typically exhibit positive dispersion slope. One type of RDF exhibits dispersion at 1550 nm of −1.32 ps/nm/km, with a slope of 0.053 $ps/nm^2/km$. No effective method exists in the prior art for compensation for the dispersion of long lengths of these fibers. Standard single mode fiber has positive dispersion which may be utilized to compensate for the dispersion of the RDF, however its low dispersion, on the order of 17 ps/nm/km at 1550 nm requires a long length of fiber to compensate for the dispersion, thus incurring unwanted losses. In addition, the slope of the single mode fiber is of the same sign as the RDF, and thus does not compensate at all for the slope. There is thus a need for a fiber with strongly positive dispersion. It is also desirable that the fiber have a negative slope so as to compensate as well for the dispersion slope.

DEFINITIONS

The term $\Delta$ is often used by itself in fiber design to define the relative difference in the maximum refractive index in a doped area ($n_{max}$) and the index of refraction of the cladding $n_{clad}$, and is usually described as a percentage and defined by the equation $\Delta=(n_{max}^2-n_{clad}^2)/2n_{max}^2 \times 100$. Undoped silica cladding has a typical refractive index of 1.444 at a wavelength of 1550 nm.

The radii of the regions of the core are defined in terms of the index of refraction. A particular region begins at the point where the refractive index characteristic of that region begins, and a particular region ends at the last point where the refractive index is characteristic of that particular region. In general, we will use the point of return to the refractive index of the cladding to define the border between two adjacent regions that cross the cladding index. Radius will have this definition unless otherwise noted in the text.

SUMMARY OF THE INVENTION

Accordingly, it is a principal object of the present invention to overcome the disadvantages of the prior art in compensating for RDF. This is provided in the present invention by providing an optical waveguide having positive dispersion when operated substantially in a single high order mode.

In accordance with a preferred embodiment of the present invention, there is provided an optical waveguide having a refractive index profile pre-selected to have positive dispersion for optical signals in a high order mode, with the positive dispersion being greater than 50 ps/nm/km at a given wavelength within the operative range. In one embodiment the optical waveguide is a few mode fiber. In another embodiment the positive dispersion is greater than 100 ps/nm/km. In another embodiment the optical waveguide also has positive dispersion slope. In another embodiment the optical waveguide has negative dispersion slope. In yet another embodiment the optical waveguide has a nominally zero dispersion slope.

In a preferred embodiment the high order mode is the $LP_{02}$ mode. In another preferred embodiment the high order mode is the $LP_{03}$ mode.

The present invention also relates to a method of providing positive dispersion comprising the steps of providing an optical waveguide having a refractive index profile pre-selected to generate positive waveguide dispersion when operating in substantially a single high order mode, and operating the optical waveguide in said single high order mode in an operative range, whereby the total dispersion of the waveguide, equal to the sum of the material dispersion and its waveguide dispersion is greater than 50 ps/nm/km at a given wavelength within the operative range.

The present invention also relates to apparatus for introducing positive dispersion to an optical signal comprising at least one mode transformer and an optical waveguide having a refractive index profile pre-selected to generate positive dispersion to the optical signal when operated substantially in a single high order mode, the optical waveguide being in optical communication with the output of the mode transformer; whereby the optical signal is output from the mode transformer in the high order mode, and the output of the mode transformer is an optical signal substantially in the single high order mode.

In an exemplary embodiment the mode transformer is a transverse mode transformer.

Additional features and advantages of the invention will become apparent from the following drawings and description.

BRIEF DESCRIPTION OF THE DRAWINGS

The above and further advantages of the present invention may be better understood by referring to the following description taken in conjunction with the accompanying drawings in which like numerals designate corresponding elements or sections throughout, and in which.

DETAILED DESCRIPTION OF THE PREFERRED EMBODIMENTS

Figure 1:
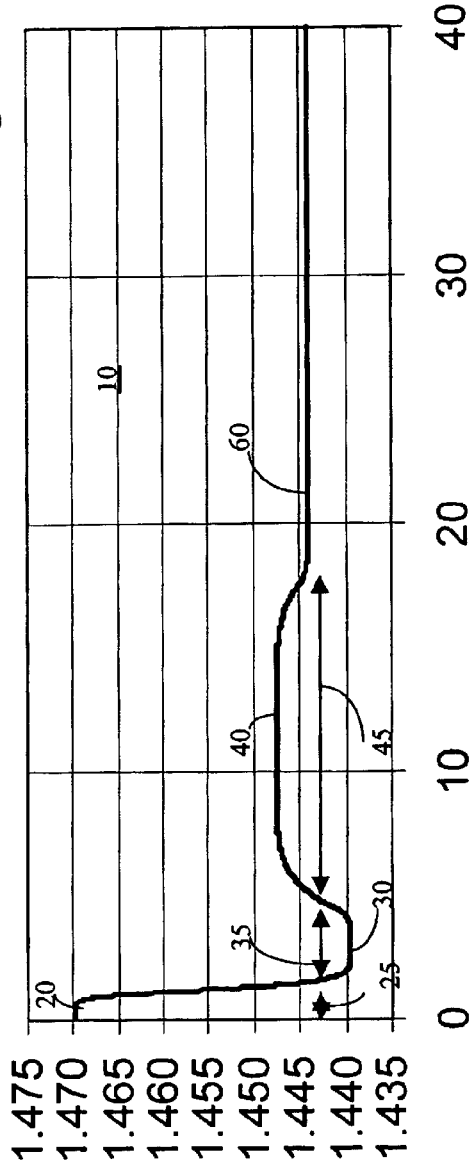
FIG. 1 illustrates a refractive index profile designed to exhibit positive dispersion and negative dispersion slope in the $LP_{02}$ mode over the "C" band.

FIG. 1 illustrates a radial view of a refractive index profile 10 designed to exhibit positive dispersion and negative slope in the $LP_{02}$ mode. The x-axis indicates the radial position in microns, and the y-axis indicates the refractive index of the fiber at the operative wavelength of 1550 nm. Refractive index profile 10 comprises first core area 20 with radius 25, second core area 30 with radius 35, third core area 40 with radius 45, and cladding area 60. First core area 20 has a general shape wherein the refractive index varies over the radius 25, with a peak refractive index of approximately 1.4699 for a $\Delta_1$ of 1.7531, and a relatively small radius 25 of 1.47 microns. Radius 25 is also known as $a_1$. Second core area 30, adjacent to first core area 20, has a general shape exhibiting a depressed index of approximately 1.4396 for a $\Delta_2$ of −0.3061, and a relatively small radius 35 of 3.67 microns. Radius 35 is also known as $a_2$. Third core area 40, adjacent to second core area 30, has a general shape exhibiting an increased refractive index of approximately 1.4475 for a $\Delta_3$ of 0.2415, and a relatively wide radius 45 of 12.45 microns. Radius 45 is also known as $a_3$. Cladding area 60 is adjacent to third area 40, and extends the balance of the radius of the fiber, and exhibits the refractive index of undoped silica glass which is 1.444. The ratio of $a_2/a_1$, is approximately 2.5 and the ratio of $a_3/a_1$, is approximately 8.5.

Figure 2:
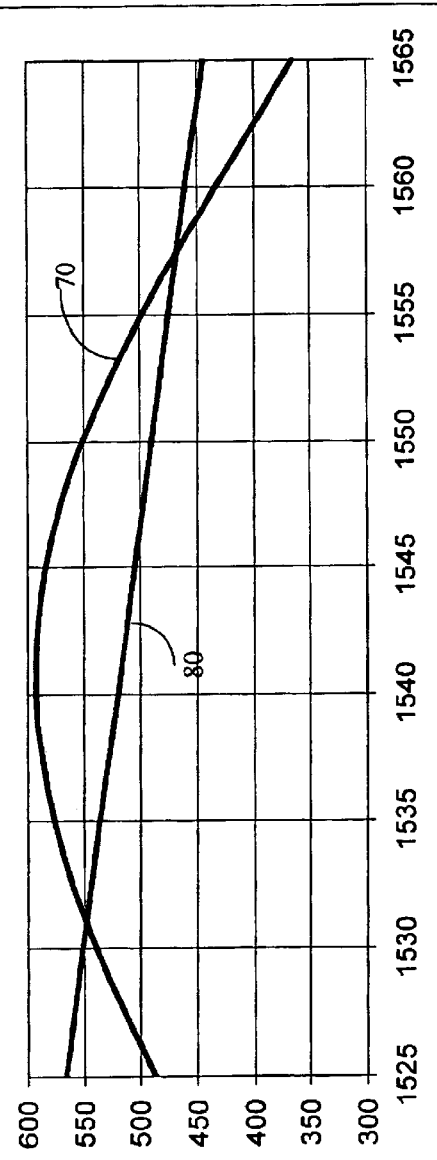
FIG. 2 illustrates the dispersion curve of the refractive index profile illustrated in FIG. 1 over the "C" band.

FIG. 2 illustrates a plot of the dispersion in the $LP_{02}$ mode for the few mode fiber profile 10 of FIG. 1, with the x-axis representing wavelength and the y-axis representing dispersion in ps/nm/km. Curve 70 represents the calculated dispersion for the few mode profile 10 of FIG. 1 in the $LP_{02}$ mode, and curve 80 represents a linear best fit dispersion curve. Dispersion is strongly positive with an average of approximately 500 ps/nm/km. Slope is negative, with the slope of the linear best fit being −3 ps/nm$^2$/km. The curve shows a large deviation from the linear dispersion fit when viewed over the entire C band of 1525 nm–1565 nm. The deviation from a linear fit will typically be a cause of residual dispersion when used to compensate for a fiber that has a linear dispersion slope.

Figure 3:
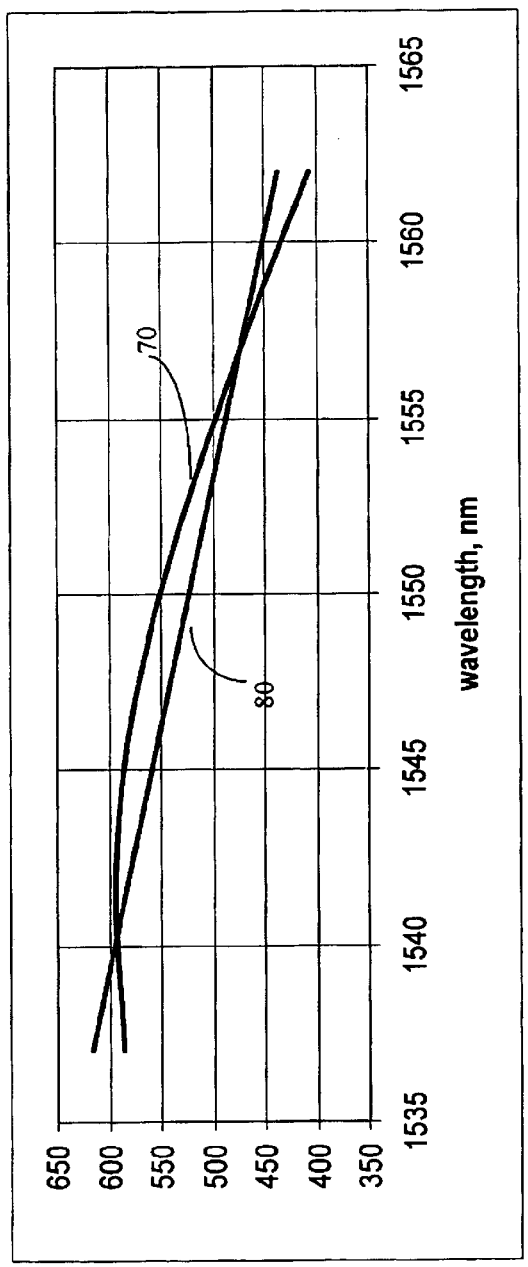
FIG. 3 illustrates the dispersion curve of the refractive index profile illustrated in FIG. 1 over a sub-portion of the "C" band.

FIG. 3 illustrates a plot of the dispersion in the $LP_{02}$ mode for the few mode fiber profile 10 of FIG. 1 over a reduced bandwidth, also known as a sub-band, exhibiting significantly less deviation for a linear dispersion fit. The x-axis of FIG. 3 represents wavelength and the y-axis represents dispersion in ps/nm/km. Curve 70 represents the calculated dispersion for the few mode profile 10 of FIG. 1 in the $LP_{02}$ mode from 1537 nm to 1562 nm, and curve 80 represents a linear best fit dispersion curve. Dispersion is strongly positive with an average of approximately 500 ps/nm/km. Dispersion slope is negative, with the slope of the linear best fit being approximately −7.18 ps/nm$^2$/km.

Figure 4:
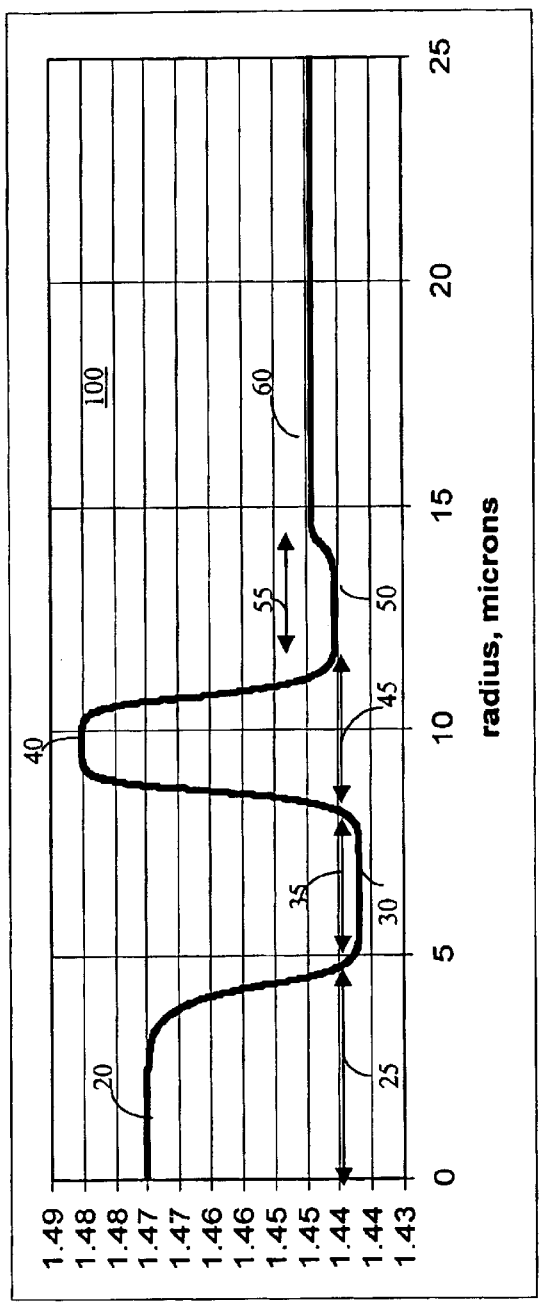
FIG. 4 illustrates a second refractive index profile designed to exhibit positive dispersion and negative dispersion slope in the $LP_{02}$ mode over the "C" band.

FIG. 4 illustrates a radial view of a refractive index profile 100 designed to exhibit positive dispersion and negative slope in the $LP_{02}$ mode. The x-axis indicates the radial position in microns, and the y-axis indicates the refractive index of the fiber at the operative wavelength of 1550 nm. Refractive index profile 100 comprises first core area 20 with radius 25, second core area 30 with radius 35, and third core area 40 with radius 45, fourth core area 50 with radius 55 and cladding area 60. First core area 20 has a general shape wherein the refractive index varies over the radius 25, with a peak refractive index of approximately 1.4701 for a $\Delta_1$ of 1.7596, and a radius 25 of 4.51 microns. Radius 25 is also known as $a_1$. Second core area 30, adjacent to first core area 20, has a general shape exhibiting a depressed index of approximately 1.4368 for a $\Delta_2$ of −0.5024, and a radius 35 of 3.88 microns. Radius 35 is also known as $a_2$. Third core area 40, adjacent to second core area 30, has a general shape exhibiting an increased refractive index of approximately 1.4841 for a $\Delta_3$ of 2.6655, and a radius 45 of 2.79 microns. Radius 45 is also known as $a_3$. It is to be noted that the refractive index $\Delta_3$ is greater than the refractive index $\Delta_1$. Fourth core area 50, adjacent to third core area 40, has a general shape exhibiting a decreased refractive index of approximately 1.4405 for a $\Delta_4$ of −0.2433, and a radius 55 of 3.16 microns. Radius 55 is also known as $a_4$. It is to be noted that the refractive index $\Delta_3$ is depressed only slight less than refractive the refractive index $\Delta_2$. Cladding area 60, adjacent to fourth core area 55 extends the balance of the radius of the fiber, and exhibits the refractive index of silica glass of 1.444. The ratio of $a_2/a_1$, is approximately 0.86, the ratio of $a_3/a_1$, is approximately 0.62 and the ratio of $a_4/a_1$ is approximately 3.16.

Figure 5:
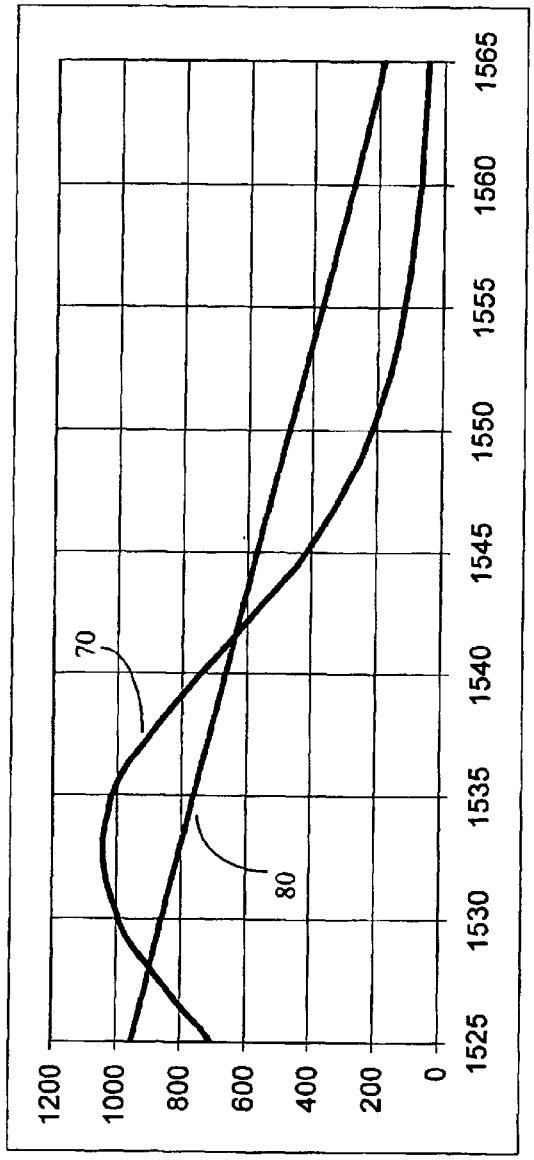
FIG. 5 illustrates the dispersion curve of the refractive index profile illustrated in FIG. 4 over the "C" band.

FIG. 5 illustrates a plot of the dispersion in the $LP_{02}$ mode for the few mode fiber profile 100 of FIG. 4, with the x-axis representing wavelength and the y-axis representing dispersion in ps/nm/km. Curve 70 represents the calculated dispersion for the few mode profile 100 of FIG. 1 in the $LP_{02}$ mode, and curve 80 represents a linear best fit dispersion curve. Dispersion is strongly positive with an average of approximately 500 ps/nm/km. Dispersion slope is negative, with the slope of the linear best fit being −19 ps/nm$^2$/km. The curve shows a large amount of deviation from the linear fit when viewed over the entire C band of 1525 nm–1565 nm, however as explained in connection with FIG. 2 it is clear that over a subband the deviation is significantly less.

Figure 6:
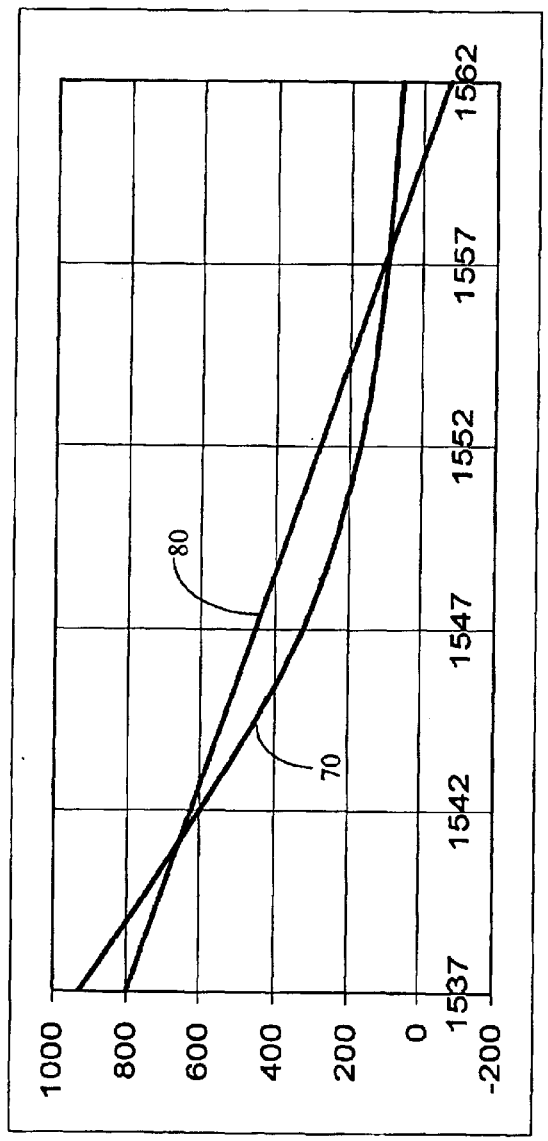
FIG. 6 illustrates the dispersion curve of the refractive index profile illustrated in FIG. 1 over a sub-portion of the "C" band.

FIG. 6 illustrates a plot of the dispersion in the $LP_{02}$ mode for the few mode fiber profile 100 of FIG. 1 over a reduced bandwidth, exhibiting significantly less deviation from a linear fit. Other sub-bands may be chosen without exceeding the scope of the invention. The x-axis of FIG. 6 represents wavelength and the y-axis represents dispersion in ps/nm/km. Curve 70 represents the calculated dispersion for the few mode profile 100 of FIG. 1 in the $LP_{02}$ mode from 1537 nm to 1562 nm, and curve 80 represents a linear best fit dispersion curve. Dispersion is strongly positive with an average of approximately 360 ps/nm/km. Slope is strongly negative, with the slope of the linear best fit being approximately −34.7 ps/nm$^2$/km. An interesting feature of the curve 70 of FIG. 6 is that it is close to zero at the 1550–1560 nm wavelength. Such a wavelength is often designed to have zero dispersion in undersea cable installations.

Figure 7:
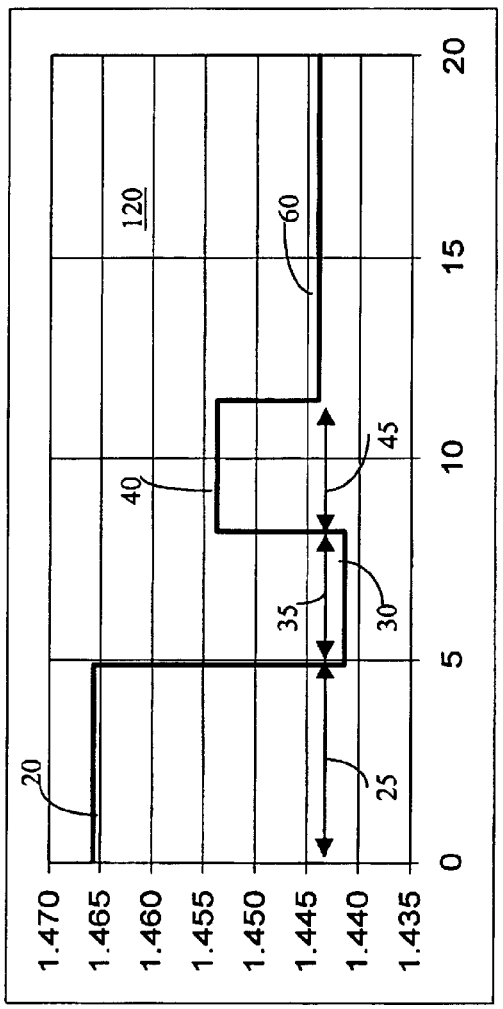
FIG. 7 illustrates a step index profile designed to exhibit positive dispersion and negative dispersion slope in the $LP_{03}$ mode over the "C" band.

The above two examples illustrate fiber designs suitable for operation in the $LP_{02}$ mode. FIG. 7 illustrates a radial view of a refractive step index profile 120 designed to operate in the $LP_{03}$ mode. The x-axis indicates the radial position in microns, and the y-axis indicates the refractive index of the fiber at the operative wavelength of 1550 nm. Step index profile 120 comprises first core area 20 with radius 25, second core area 30 with radius 35, and third core area 40 with radius 45, and cladding area 60. First core area 20 exhibits a refractive index over the radius 25 of approximately 1.46567 for a $\Delta_1$of 1.4669, and a relatively wide radius 25 of 4.9 microns. Radius 25 is also known as $a_1$. Second core area 30 adjacent to first core area 20, exhibits a depressed index of approximately 1.4414 for a $\Delta_2$ of −0.18505, and a radius 35 of 3.3 microns. Radius 35 is also known as $a_2$. Third core area 40, adjacent to second core area 30 exhibits an increased refractive index of approximately 1.4538 for a $\Delta_3$ of 0.6731, and a relatively wide radius 45 of 3.25 microns. Radius 45 is also known as $a_3$. Cladding area 60 is adjacent to third area 40, and extends the balance of the radius of the fiber. Cladding area 60 exhibits the refractive index of undoped silica glass, namely 1.444. The ratio of $a_2/a_1$, is approximately 0.67 and the ratio of $a_3/a_1$ is approximately 0.66.

Figure 8:
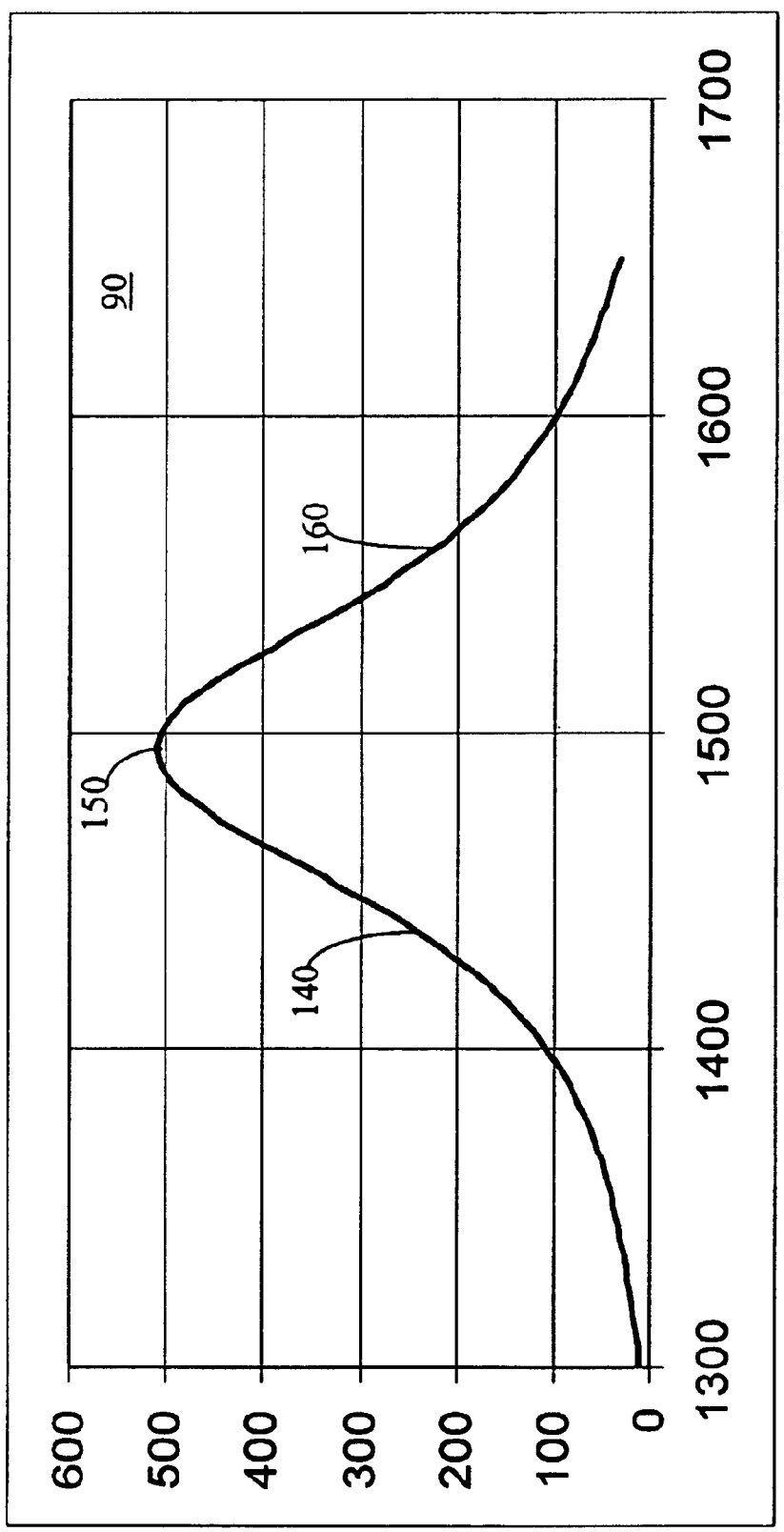
FIG. 8 illustrates the dispersion curve of the step index profile illustrated in FIG. 7 over a broad optical spectrum.

FIG. 8 illustrates the dispersion curve 90 experienced by the $LP_{03}$ mode in the fiber of step index profile 120 of FIG. 7 over a broad range of wavelengths, in which the x-axis represents wavelength and the y-axis represents dispersion in ps/nm/km. In the region 140 from 1300 nanometers to approximately 1500 nm, dispersion is positive, with a highly positive slope. A peak is experienced at point 150 which is approximately at 1500 nm, following which dispersion remains positive. A negative slope exists in area 160 declining to a zero crossing at around 1650 nm. Over the traditional "C" band, the dispersion curve is relatively straight, with positive dispersion and a negative slope. It is to be noted that by changing the width of the respective areas $a_1$ and $a_2$ of the profile 120 of FIG. 7 the curve 90 can be adjusted so as to move the desired dispersion and slope into the operating area desired. Different embodiments of the profile can be designed to exhibit strongly positive dispersion with either positive, negative or zero dispersion slope.

Figure 9:
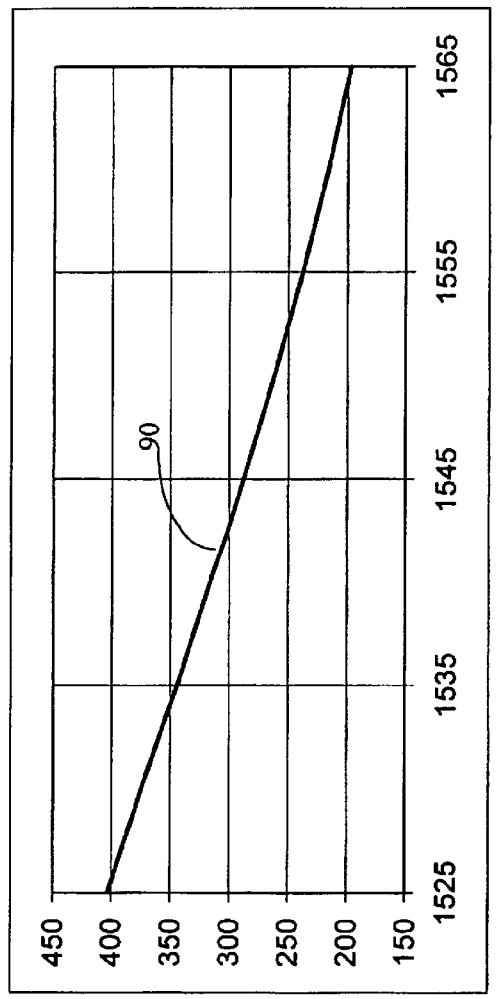
FIG. 9 illustrates the dispersion curve of the step index profile of FIG. 7 over the "C" band.

FIG. 9 illustrates an exploded view of the dispersion experienced by the $LP_{03}$ mode in the fiber of step index profile 120 over the "C" band. The line 90 represents the sum of the material dispersion and waveguide dispersion experienced by the $LP_{03}$ mode in the fiber. The dispersion 90 is relatively linear, running from a positive value of approximately 400 ps/nm/km at 1525 nm to approximately 200 psn/nm/km at 1565 nm. The dispersion is strongly positive over the entire "C" band, exhibiting a negative slope of –5.2 ps/nm$^2$/km. The dispersion 90 is sufficiently linear that no linear fit curve has been shown.

Figure 10:
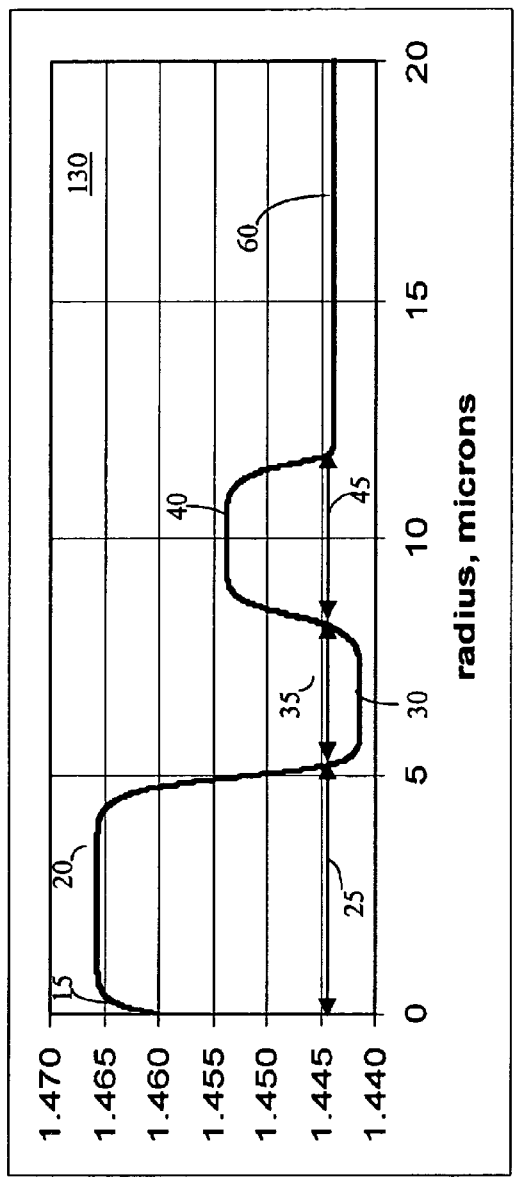
FIG. 10 illustrates a refractive index profile designed to exhibit positive dispersion and negative dispersion slope in the $LP_{03}$ mode over the "C" band.

FIG. 10 illustrates a second profile with more rounded edges typical of fibers produced using the MCVD or other process. It is to be understood that both this profile and the profile shown in FIG. 1 and FIG. 4 may be produced by any appropriate process, including without limitation, OVD, MCVD, PCVD and AVD without exceeding the scope of the invention. The x-axis indicates the radial position in microns, and the y-axis indicates the refractive index of the fiber at the operative wavelength of 1550 nm. Refractive index profile 130 comprises dip 15, first core area 20 with radius 25, second core area 30 with radius 35, and third core area 40 with radius 45, and cladding area 60. Dip 15 near the core center occurs as a side product of the manufacturing process and its impact is negligible. First core area 20 adjacent to center dip 15 has a general shape wherein the refractive index varies over the radius 25, with a peak refractive index of approximately 1.4660 for a $\Delta_1$ of 1.501, and a radius 25 of 5.0 microns. Radius 25 is also known as $a_1$. Second core area 30, adjacent to first core area 20, has a general shape exhibiting a depressed index of approximately 1.4420 for a $\Delta_2$ of –0.18, and a radius 35 of 3.4 microns. Radius 35 is also known as $a_2$. Third core area 40, adjacent to second core area 30, has a general shape exhibiting an increased refractive index of approximately 1.4540 for a $\Delta_3$ of 0.68, and a radius 45 of 3.25 microns. Radius 45 is also known as $a_3$. Cladding area 60 is adjacent to third area 40, and extends the balance of the radius of the fiber, and exhibits a refractive index of 1.444. The ratio of $a_2/a_1$ is approximately 0.68 and the ratio of $a_3/a_1$ is approximately 0.65.

Figure 11:
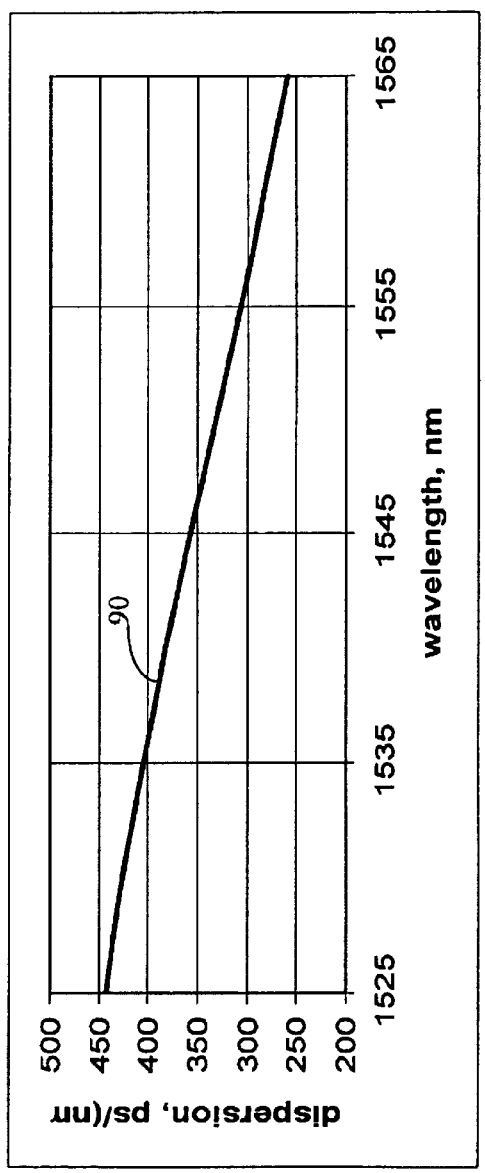
FIG. 11 illustrates the dispersion curve of the refractive index profile illustrated in FIG. 10 over the "C" band.

FIG. 11 illustrates the dispersion experienced by the $LP_{03}$ mode in the fiber of index profile 130 of FIG. 10 over the "C" band. The curve 90 represents the sum of the material dispersion and waveguide dispersion experienced the LP03 mode in the fiber. The dispersion shown by curve 90 is relatively linear, running from a positive value of approximately 450 ps/nm/km at 1525 nm, to approximately 330 ps/nm/km at 1550 nm and approximately 265 ps/nm/km at 1565 nm. The dispersion is strongly positive over the entire "C" band, exhibiting a negative slope of –4.55 ps/nm$^2$/km.

Figure 12:
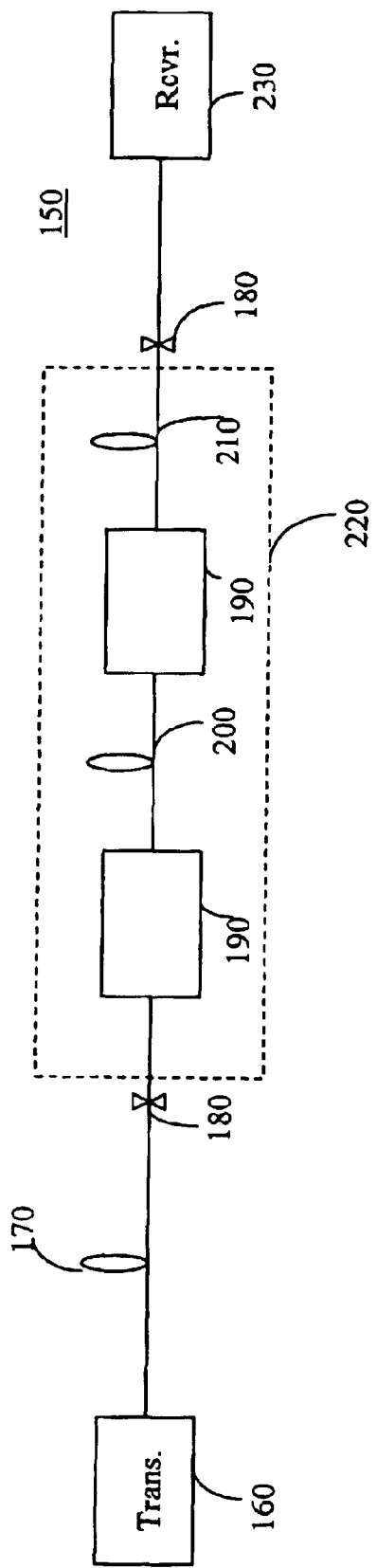
FIG. 12 illustrates an optical transmission system utilizing the inventive fiber.

FIG. 12 illustrates a block diagram of transmission system 150 comprising transmitter 160, RDF 170, splices or connectors 180, mode transformers 190, HOM fiber 200, dispersion compensating fiber (DCF) 210, dispersion management device 220 and receiver 230. The output of transmitter 160 is connected to a first end of RDF 170, and the second end of RDF 170 is connected through a connector or splice 180 to the input of dispersion management device 220. Dispersion management device 220 comprises mode transformers 190, HOM fiber 200 and DCF 210. The second end of RDF 170 is thus connected through connector or splice 180 to the input of first mode transformer 190. The output of first mode transformer 190 is connected to one end of HOM fiber 200, and the other end of HOM fiber 200 is connected to the input of second mode transformer 190. The output of second mode transformer 190 is connected to a first end of DCF 210, and the second end of DCF 210 is connected through connector or splice 180 to the input of receiver 230. DCF 210 is thus connected through connector or splice 180 to exit dispersion management device 220 and is optically coupled to receiver 230.

In operation, the system 150 of FIG. 12 utilizes HOM fiber 200 comprising profile 130 of FIG. 10 to compensate for a length of RDF 170. Transmitter 160 transmits the optical signal into a length of RDF 170, which is of the type shown in U.S. Pat. No. 6,091,873 and exhibits a dispersion at 1550 nm of –1.32 ps/nm/km, with a positive slope of 0.053 ps/nm$^2$/km. In an exemplary embodiment the length of RDF 170 is 100 kilometers prior to the signal requiring amplification or reconversion to an electrical signal, and the signal experiences –132 ps/nm of total dispersion and a slope of 5.3 ps/nm$^2$ at 1550 nm. In another embodiment a different length for RDF 170 exists, and in still another embodiment an optional optical amplifier (not shown) such as the first stage of an EDFA may be installed at the output of RDF 170 prior to connection to first mode transformer 190.

The output of RDF 170, optionally having been amplified, is optically coupled by optical splice or optical connector 180 to first mode transformer 190, which is designed to convert the optical signal from the fundamental mode to the single high order mode supported by HOM fiber 200, which in the exemplary embodiment is the $LP_{03}$ mode. It another embodiment HOM fiber 200 comprises a profile such as 10 of FIG. 1, or profile 100 of FIG. 4, and mode transformer 190 converts the optical signal to the $LP_{02}$ mode. Mode transformers 190 in an exemplary embodiment are of the type described in co-pending U.S. patent application Ser. No. 09/248,969 filed Feb. 12, 1999 entitled "Transverse Spatial Mode Transformer for Optical Communication" whose contents are incorporated herein by reference. In another embodiment a longitudinal mode transformer is utilized. It is to be noted that mode transformer 190 is the input stage of dispersion management device 220, which is designed to fully compensate for both the dispersion and slope of RDF 170 and is further described in U.S. Pat. Ser No. 6,339,665 whose contents are incorporated herein by reference. The output of first mode transformer 190, is optically coupled to a length of HOM fiber 200, which acts to partially compensate for the dispersion and slope experienced by the signal due to RDF 170. In the exemplary embodiment, HOM fiber 200 comprises a length of 1.12 meters of a fiber comprising profile 130 described in connection with FIG. 10, and at 1550 nm imparts dispersion of 372 ps/nm and a slope of –5.10 ps/nm$^2$. It is to be noted that the slope of RDF 170 is nearly completely compensated for by HOM fiber 200, however the dispersion is overcompensated.

The output of HOM fiber 200 is optically coupled to second mode transformer 190 which converts the optical signal from mode $LP_{02}$ to the fundamental mode $LP_{01}$. The output of the second mode transformer 190 is optically coupled to a length of trim fiber, DCF 210, which serves to trim the dispersion and slope to the precise desired values. Trim fiber 210, comprising DCF is well known to those skilled in the art, and exhibits a dispersion of −90 ps/nm/km and a slope of −0.085/ps/nm²/km, and in the exemplary embodiment is a total length of 2.67 kilometers imparting a total dispersion of −240 ps/nm and a slope of −0.23 ps/nm² at 1550 nm. The signal is thus fully compensated for as shown in Table 1, with a net of substantially zero dispersion and zero slope.

TABLE 1

| Effect on Signal at 1550 nm | Dispersion | Slope |
| --- | --- | --- |
| RDF 170 | −132 ps/nm | 5.3 ps/nm² |
| HOM fiber 200 | 372 ps/nm | −5.10 ps/nm² |
| DCF trim fiber 210 | −240 ps/nm | −0.23 ps/nm² |
| Net Result | 0 ps/nm | 0.03 ps/nm² |

The output of DCF 210 is connected by an optical splice or optical connector 180 at the output of dispersion management device 220 to receiver unit 230 which reconverts the signal to an electrical signal. Optical splice or connector 180 is designed to match the size of the DCF 210 core to the standard pigtail connector of receiver 230, and in one embodiment is an adiabatic splice. In an alternative embodiment, receiver 230 is replaced with a second stage of an optical amplifier such as EDFA.

The above has been described in connection with a specific transmission fiber 170, with specific RDF characteristics. This is not meant to be limiting in any way, and other architectures are possible, in which HOM fiber 200 is designed to exhibit strongly positive dispersion with positive or near zero dispersion slope, and any over or under correction is corrected by trim fiber 210. In another embodiment HOM fiber 200 completely corrects for the dispersion and slope of transmission fiber 170, and trim fiber 210 is replaced with an optical jumper, thus optically directly connecting the output of second mode transformer 190 to receiver 230, or to another optical device.

A further usage for the inventive fiber is to correct for the residual dispersion in a system. The residual dispersion and residual dispersion slope may be a consequence of long spans of fiber wherein compensation has not been completely accomplished. An additional useage is the ability to add a pre-determined amount of dispersion to a system in order to minimize non-linear effects. The inventive fiber herein described, allows for the introduction of positive dispersion with either positive, negative or zero slope.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

We claim:

1. An optical waveguide having a refractive index profile pre-selected to generate positive dispersion when operated substantially in a single high order mode, such that the total dispersion of said waveguide, equal to the sum of the material dispersion and the waveguide dispersion is greater than 50 ps/nm/km at a given wavelength within the operative range.

2. The optical waveguide of claim 1 wherein said total dispersion is greater than 100 ps/nm/km at said given wavelength within the operative range.

3. The optical waveguide of claim 1 wherein said optical waveguide is a few mode fiber.

4. The optical waveguide of claim 1 wherein said optical waveguide has a positive dispersion slope at said given wavelength.

5. The optical waveguide of claim 1 wherein said optical waveguide has a negative dispersion slope at said given wavelength.

6. The optical waveguide of claim 1 wherein said optical waveguide has a nominally zero dispersion slope at said given wavelength.

7. The optical waveguide of claim 1 wherein said single high order mode is the $LP_{02}$ mode.

8. The optical waveguide of claim 1 wherein said single high order mode is the $LP_{03}$ mode.

9. A method of generating positive dispersion comprising the steps of;

providing an optical waveguide having a refractive index profile pre-selected to generate positive waveguide dispersion when operating in substantially a single high order mode, and operating said optical waveguide in said single high order mode in an operative range, whereby the total dispersion of said waveguide, equal to the sum of the material dispersion and said waveguide dispersion is greater than 50 ps/nm/km at a given wavelength within said operative range.

10. The method of claim 9 wherein said optical waveguide is a few mode fiber.

11. The method of claim 9 wherein the sum of the material dispersion and said waveguide dispersion is greater than 100 ps/nm/km at a given wavelength within said operative range.

12. The method of claim 9 wherein said optical waveguide has a positive slope at said given wavelength.

13. The method of claim 9 wherein said optical waveguide has a negative slope at said given wavelength.

14. The method of claim 9 wherein said optical waveguide has a nominally zero dispersion at said given wavelength.

15. The method of claim 9 wherein said single high order mode is the $LP_{02}$ mode.

16. The method of claim 9 wherein said single high order mode is the $LP_{03}$ mode.

17. An apparatus for introducing positive dispersion to an optical signal comprising;

at least one mode transformer;

an optical waveguide having a refractive index profile pre-selected to generate positive dispersion to the optical signal when operated substantially in a single high order mode, said optical waveguide being in optical communication with the output of said mode transformer;

whereby said optical signal is output from said mode transformer in said high order mode, and the output of said mode transformer is an optical signal substantially in said single high order mode.

18. The apparatus of claim 17 wherein said mode transformer is a transverse mode transformer.

19. The apparatus of claim 17 wherein said high order mode is the $LP_{02}$ mode.

20. The apparatus of claim 17 wherein said high order mode is the $LP_{03}$ mode.

* * * * *